UNITED STATES PATENT OFFICE.

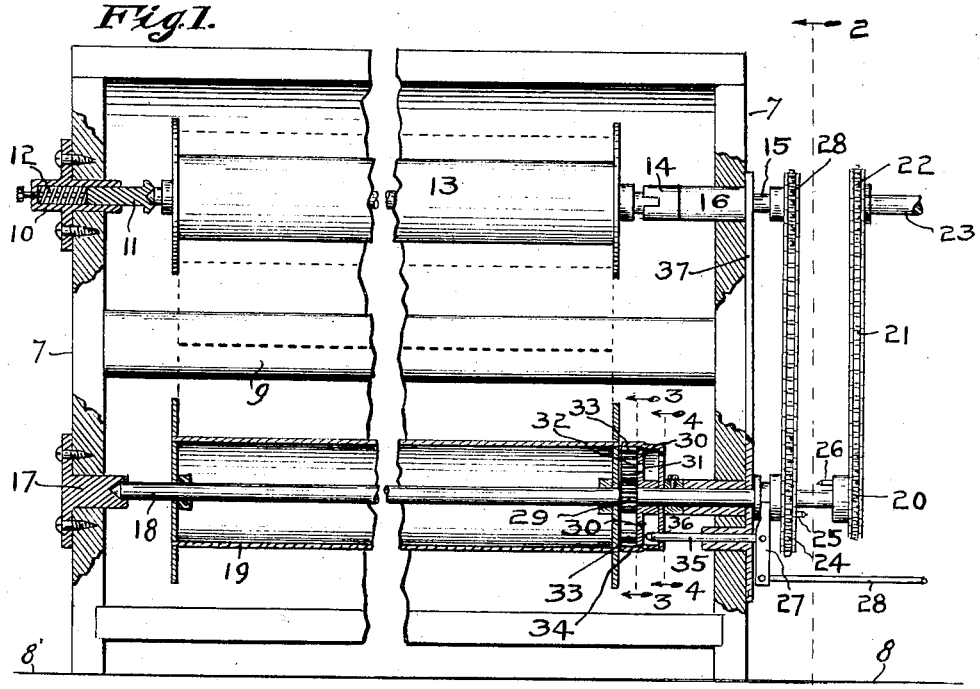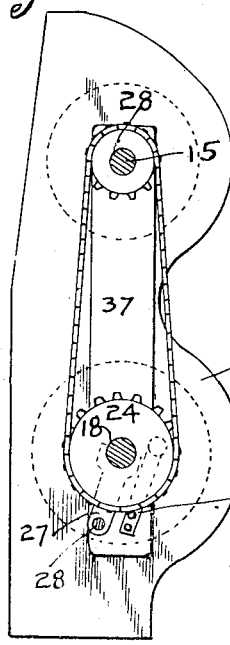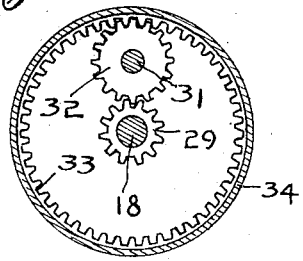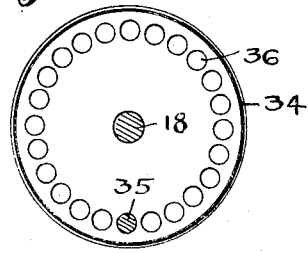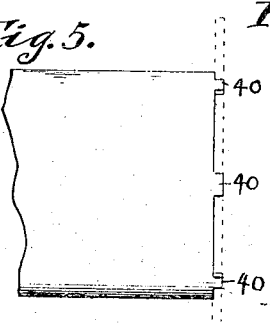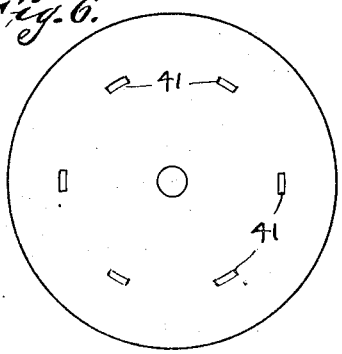

GEORGE H. STANT, OF CONNERSVILLE, INDIANA.

TRANSMISSION FOR PLAYER-PIANOS.

1,168,435.  Specification of Letters Patent.  Patented Jan. 18, 1916.

Application filed March 13, 1915. Serial No. 14,160.

*To all whom it may concern:*

Be it known that I, GEORGE H. STANT, a citizen of the United States, residing at Connersville, in the county of Fayette and State of Indiana, have invented certain new and useful Improvements in Transmission for Player-Pianos, of which the following is a specification.

My invention relates to pneumatic mechanical piano players wherein the operation is controlled by a perforated paper strip, which, being previously wound upon a spool, is inserted in the instrument and is drawn across a tracker-bar by the attachment of the strip to a winding-roll on the other side of said tracker-bar.

The object of my invention is to provide a simple and efficient means for transmitting power at will to unwind the music from the spool and then re-wind the same after the composition has been played.

Another object is to assemble the re-winding gears in a closed housing which will afford protection from injury and permit the use of a hard oil or other stiff lubricant making the operation of the gears noiseless and easy.

A further object is to provide a more durable and compact construction for the spool and roll making the assembly of the re-winding gears close to the end of the re-winding roll possible.

I accomplish the above, and other objects which will hereinafter appear, by the mechanism illustrated in the accompanying drawings, in which—

Figure 1, is a front elevation in partial vertical section; Fig. 2, an end elevation and vertical section on the line 2—2 of Fig. 1; Fig. 3, a section of the housing in which the re-winding gear is assembled, showing the latter, on the line 3—3, of Fig. 1; Fig. 4, is a section on the line 4—4, of Fig. 1; Fig. 5, is a fragment in side elevation and Fig. 6, an end view showing the details of construction of the music spool and roll.

Like characters of reference indicate like parts throughout the several views of the drawings.

Referring to the drawings, 7 is the music-sheet roll-box which rests upon a shelf 8. A tracker-board 9 is mounted at the horizontal middle of the box in the usual manner. Mounted in one end of the roll-box is a spring-cup 10 opening into the box, in which open end is a plunger 11, normally projected by a spring 12, and having a socket to receive the axial shaft of a music spool 13, on which the perforated music-strip to be played, has been wound before the placing of the spool in the machine. The opposite end of the axial shaft of the spool has a radial extension which is inserted in a slot formed to receive it in a head 14, carried by a shaft 15, extending outside of the roll-box through a journal 16.

Mounted in the same end of the roll-box as the spring-cup 10, is a stub 17 having a socket in its inner end to receive the end of a horizontal shaft 18, which extends thence to and through the opposite side of the roll-box and for a suitable distance beyond. Mounted in a loose manner on the shaft 18, is a winding-roll 19, immediately below the spool 13, and on the end of the shaft outside of the roll-box, is a fixed sprocket wheel 20, which is driven by a link-belt 21 from a sprocket wheel 22 on a superimposed motor-shaft 23. Mounted, also, on the end of the shaft 18 which projects outside of the roll-box, is a sprocket wheel 24, which is journaled freely on said shaft and is provided with the usual clutch-pin 25, to engage with a corresponding clutch-pin 26 in the hub of the sprocket wheel 20. The hub of the sprocket wheel 24 has a circumferential slot into which is projected the end of a shifting-lever 27. The sprocket wheel 24 is connected with a sprocket wheel 28 mounted in a fixed manner on the shaft 15. The shifting-lever 27 is moved to throw the sprocket wheel 24 in and out of clutch engagement by a rod 28, which is connected in the usual manner with the usual hand-operated means, (not shown).

Mounted in a fixed manner upon the shaft 18, is a spur-pinion 29, and loosely mounted on the shaft is a winding roll 19. Mounted loosely on the shaft by the side of the pinion 29 is a disk 30 which supports a short shaft 31 on which a spur gear wheel 32 is loosely mounted. Surrounding the two spur gears above mentioned and concentric with the shaft 18 is an internal gear 33, which is fixed to the end of the roll 19. The disk and the above gears are assembled within a housing 34 which is loosely mounted upon the shaft 18 but is adapted to be held from rotation at times by a pin 35 pivotally secured to the shifting-lever 27, and adapted to be projected through one of an annular series of holes 36 in the end of the housing when the shifting-lever is moved to the position shown in Fig. 1. The disk 30 is secured to and moves with the housing and remains stationary when the housing is held. The bearings for the shafts 15 and 18, and for the pin 35, are secured by integral construction or otherwise to a plate 37, on the end of the roll-box 7 to insure accuracy of assembly and strength of parts.

The body of the spool 13, and roll 19, will preferably be formed out of metal tubing on the ends of which projecting tongues 40 are formed to enter corresponding openings 41, punched in sheet metal end disks 42. The tongues, after insertion in the holes of the disks, will be spread or bent to make the resulting joint solid and strong.

The operation of my invention is as follows: Starting with the parts in the position for unwinding the paper strip from the spool, as shown in Fig. 1, power from the motor-sprocket 22, is transmitted through the belt 21 to the fixed sprocket 20 on the shaft 18, and through the latter to the pinion 29. The shaft of the spur-gear 32 remains stationary while the gear 32 is rotated on it, and being in mesh with the internal gear 33 on the end of roll 19, it rotates the latter in an opposite direction to the movement of the shaft at a much reduced speed. By reason of the paper music strip being fastened to the roll the strip will be wound off of the spool 13 and upon the roll 19. Then, by moving the sprocket 24 into engagement of its clutch-pin with the pin on sprocket 20—which is done by moving the shifting-bar 27 away from roll-box 7, the pin 35 will be withdrawn from the housing 34, leaving the latter to float loosely on the shaft 18, and negativing the action of its contained gears. Coincident with the engagement of clutch-pins 25 and 26, the shaft 15 will be rotated by the transmission connecting its sprocket wheel 28 with the sprocket 24, and the spool 13 will be rotated by reason of its connection with the shaft 15, in an opposite direction and at a higher speed than that attained by the roll 19, to re-wind the paper music strip on the spool 13.

While I have described my invention with more or less minuteness as regards details of construction and arrangement and as being embodied in certain precise forms, I do not desire to be limited thereto unduly or any more than is pointed out in the claims. On the contrary, I contemplate all proper changes, construction and arrangement; the omission of immaterial elements and the substitution of equivalents as circumstances may suggest or necessity render expedient.

I claim:

1. In a musical instrument, a rotating shaft, a roll on said shaft, a gear-housing also on the shaft, power transmission and speed reduction gear assembled in said housing and means for holding one of said parts against rotation.

2. In a musical instrument, a rotating shaft, a roll on said shaft, a gear-housing mounted loosely on the shaft, gear means assembled within the housing for drivingly connecting the shaft and roll when the housing is held from rotating, and means for holding the housing from rotating.

3. In a musical instrument, a rotating shaft, a roll on said shaft, and means for driving the roll from the shaft comprising a spur pinion, an internal gear surrounding it and both concentric with the shaft, an intermediate gear meshing with the other two, and means for holding the intermediate gear from rotating.

4. In a musical instrument, a rotating shaft, a roll on said shaft, a gear-housing mounted loosely on the shaft, means for driving the roll from the shaft comprising a spur pinion, an internal gear surrounding it and fixed to the roll, an intermediate gear meshing with the other two, and means for holding the housing against rotation.

5. In a musical instrument, a rotating shaft, a roll on said shaft, means for driving the roll from the shaft comprising a spur pinion, an internal gear surrounding it and both concentric with the shaft and an intermediate gear meshing with the other two, a spool, transmission means for rotating the spool from said rotary shaft, a coupling means for releasing the spool, and means when the spool is uncoupled for holding the intermediate gear to drive the roll.

6. In a musical instrument, a rotating shaft, a roll on said shaft, a gear-housing mounted loosely on the shaft, means for driving the roll from the shaft comprising a spur pinion, an internal gear surrounding it and fixed to the housing, an intermediate gear meshing with the other two, a spool having its axis of rotation remote from that of the roll, transmission means for rotating the spool from said rotary shaft, a coupling means for releasing the spool and means working synchronously with the coupling and uncoupling means for holding the housing to drive the roll.

In witness whereof, I have hereunto set my hand and seal at Indianapolis, Indiana, this 15th day of February, A. D. one thousand nine hundred and fifteen.

GEORGE H. STANT. [L. S.]

Witnesses:
J. A. MINTURN,
F. W. WOERNER.